(12) United States Patent
Fazeli et al.

(10) Patent No.: US 10,489,989 B2
(45) Date of Patent: *Nov. 26, 2019

(54) SERVICING ASSISTING SYSTEM FOR SHOCK STRUTS WITH NEGATIVE DEAD VOLUME

(71) Applicant: Goodrich Corporation, Charlotte, NC (US)

(72) Inventors: Amir Fazeli, Ontario (CA); Adnan Cepic, Mississauga (CA)

(73) Assignee: Goodrich Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,322

(22) Filed: Jun. 12, 2018

(65) Prior Publication Data

US 2018/0293807 A1    Oct. 11, 2018

Related U.S. Application Data

(62) Division of application No. 14/969,874, filed on Dec. 15, 2015, now Pat. No. 10,017,276.

(51) Int. Cl.
*G01M 17/00* (2006.01)
*G06F 7/00* (2006.01)
(Continued)

(52) U.S. Cl.
CPC .............. *G07C 5/006* (2013.01); *B64C 25/60* (2013.01); *B64F 5/40* (2017.01); *B64F 5/60* (2017.01); *F16F 9/3264* (2013.01)

(58) Field of Classification Search
CPC ... G07C 5/006; B64F 5/60; B64F 5/40; B64C 24/60; F16F 9/3264
(Continued)

(56) References Cited

U.S. PATENT DOCUMENTS 8,262,019 B2   9/2012  Schmidt
8,275,515 B2   9/2012  Wright
(Continued)

FOREIGN PATENT DOCUMENTS

WO       2014184521      11/2014

OTHER PUBLICATIONS

USPTO, Notice of Allowance dated May 24, 2018 in U.S. Appl. No. 14/969,874.
(Continued)

*Primary Examiner* — Mahmoud S Ismail
(74) *Attorney, Agent, or Firm* — Snell & Wilmer L.L.P.

(57) ABSTRACT

System and methods for servicing and monitoring shock struts are provided. A shock strut servicing assistance system may comprise: a controller in electronic communication with a display; and a tangible, non-transitory memory configured to communicate with the controller, the tangible, non-transitory memory having instructions stored thereon that, in response to execution by the controller, cause the controller to perform operations comprising: calculating, by the controller, a dead volume of a shock strut and determining, by the controller, a first decision, the first decision being whether or not the dead volume of the shock strut is negative. A shock strut servicing assistance system may be for servicing a shock strut having a negative dead volume.

3 Claims, 8 Drawing Sheets

(51) Int. Cl.
*G06F 19/00* (2018.01)
*G07C 5/00* (2006.01)
*B64C 25/60* (2006.01)
*F16F 9/32* (2006.01)
*B64F 5/60* (2017.01)
*B64F 5/40* (2017.01)

(58) Field of Classification Search
USPC ............................................. 701/31.6, 34.3
See application file for complete search history.

(56) References Cited

U.S. PATENT DOCUMENTS

| | | | |
|---|---|---|---|
| 8,565,965 | B2 | 10/2013 | Nance |
| 8,712,634 | B2 | 4/2014 | Followell |
| 9,045,237 | B2 | 6/2015 | Nance |
| 9,856,038 | B2 | 1/2018 | Fazeli |
| 2006/0144997 | A1 | 7/2006 | Schmidt et al. |
| 2011/0214601 | A1 | 9/2011 | Martin |
| 2012/0041639 | A1* | 2/2012 | Followell .............. G01M 1/125 701/34.3 |
| 2014/0046533 | A1 | 2/2014 | Nance |
| 2015/0041268 | A1 | 2/2015 | Luce |
| 2015/0154819 | A1 | 6/2015 | Wilson |
| 2015/0266569 | A1 | 9/2015 | Fazeli et al. |
| 2015/0267769 | A1 | 9/2015 | Fazeli |
| 2016/0101877 | A1* | 4/2016 | Shepherd .............. G01F 23/296 29/402.18 |

OTHER PUBLICATIONS

European Search Report dated Aug. 18, 2017 in European Application No. 16203686.7.
Partial European Search Report dated May 17, 2017 in European Application No. 16203686.7.
USPTO; Restriction Requirement Office Action dated Nov. 15, 2017 in U.S. Appl. No. 14/969,874.
USPTO; Pre-Interview First Office Action dated Mar. 15, 2018 in U.S. Appl. No. 14/969,874.
European Patent Office, European Search Report dated Jan. 16, 2019 in Application No. 18184793.0.

* cited by examiner

SERVICING ASSISTING SYSTEM FOR SHOCK STRUTS WITH NEGATIVE DEAD VOLUME

FIELD

The present disclosure relates to landing gear, and more particularly, to systems and methods for increasing the serviceability of shock struts within landing gear.

BACKGROUND

Conventionally, various types of aircraft utilize shock strut assemblies to assist in reducing and managing energy transmitted from landing gear to the structure of an aircraft to which the landing gear is attached. Such shock strut assemblies often feature a piston that compresses a fluid within a sealed chamber. The fluid typically includes a gas segment and a liquid segment. Performance of the shock strut assembly may degrade over time. Such degradation can cause damage to other components of the aircraft, including bearings of the landing gear assembly. With typical single stage shock struts, the aircraft is lifted above the ground so that the shock strut can be in the fully extended position for servicing. Then, the shock strut may be cycled multiple times in attempt to fully remove any trapped gas internal to the shock strut during servicing. This can be time consuming and costly.

SUMMARY

A shock strut servicing assistance system is provided. A shock strut servicing assistance system may comprise: a controller in electronic communication with a display; and a tangible, non-transitory memory configured to communicate with the controller. The tangible, non-transitory memory may have instructions stored thereon that, in response to execution by the controller, cause the controller to perform operations comprising: calculating, by the controller, a dead volume of a shock strut; and determining, by the controller, a first decision, the first decision being a Boolean value based upon whether the dead volume of the shock strut is negative, In various embodiments, the operations may further comprise displaying, by the controller, a first prompt on the display, wherein the first prompt is displayed in response to the first decision being true. The operations may further comprise activating, by the controller, a first shock strut servicing assistance system in response to the first prompt being true. The operations may further comprise activating, by the controller, a second shock strut servicing assistance system in response to the first prompt being false. The first prompt may call for an operator to indicate whether or not a shock strut servicing will be performed under weight-on-wheel conditions. The operations may further comprise receiving, by the controller, a temperature of a gas and at least one shock strut design parameter, wherein the calculating is performed using the temperature of the gas and the at least one shock strut design parameter. The at least one shock strut design parameter may be received from a memory. The temperature of the gas may be received from a temperature sensor.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
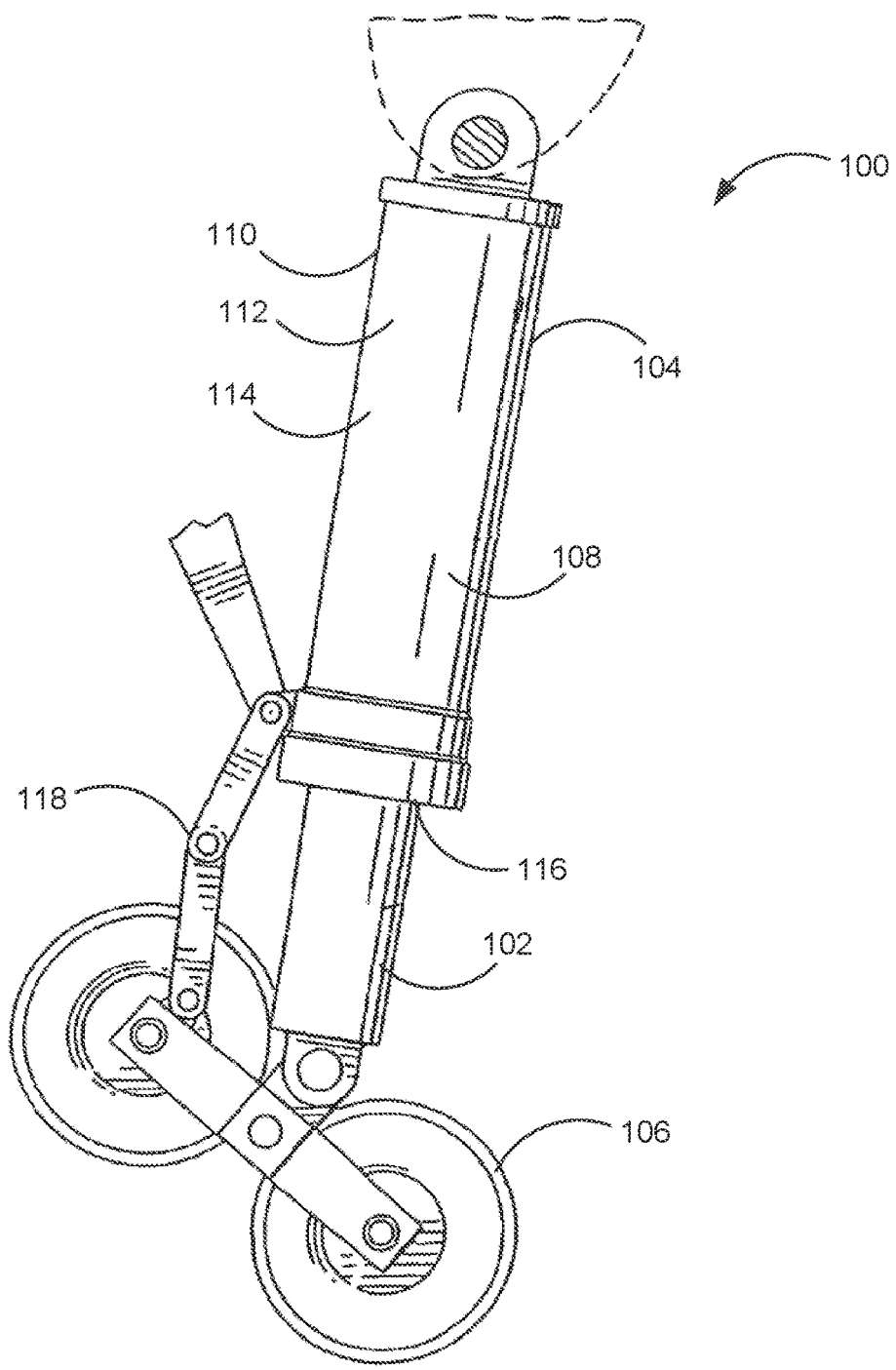
FIG. 1 illustrates a single stage shock strut for use in landing gear of an aircraft, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Aircraft landing gear systems in accordance with the present disclosure may comprise a shock strut. A shock strut may comprise various fluids such as oil and gas. Performance of the shock strut may be evaluated by monitoring aspects of the shock strut, including gas temperature, gas pressure, oil pressure, and stroke of the shock strut at various points during operation of the aircraft. Stroke may refer to a shock strut piston position. A servicing assistance system may be used in addition to a monitoring system to calculate oil loss and gas loss within a shock strut. Thus, oil and/or gas may be added to the shock strut during a maintenance process where the assisting system indicates to ground crew when the shock strut has been filled with the appropriate volume of oil and/or the gas pressure reaches a desired value. Furthermore, a controller may provide automated assistance during the servicing procedure which may eliminate the need for reference charts to determine the amount of oil or gas of which to add or remove to a shock strut. Hence, independent servicing of oil and gas in a shock strut may be performed and traditional shock strut servicing procedures may be greatly simplified. Generally, during shock strut service, oil is added to a shock strut via a first valve and gas is added to the shock strut via a second valve.

Shock strut servicing systems may be called in response to an aircraft being under a weight-on-wheel condition or a weight-off-wheel condition. An aircraft being under a weight-on-wheel condition may mean that the weight of the aircraft is supported by the wheels of the aircraft. An aircraft being under a weight-off-wheel condition may mean that the weight of the aircraft is not supported by the wheels of the aircraft and consequently is supported by some other means, such as the wings for example.

The following nomenclature corresponds to various equations and parameters described in the present disclosure:

Shock strut design parameters:
A: Piston Area
$P_{gas,nom}$: Desired gas pressure
$\Delta P_{entrainment}$: Over-pressurization needed to compensate for initial gas entrainment
$T_{gas,nom}$: Desired gas temperature
$V_{oil,nom}$: Desired oil volume
$V_{tot-in-air}$: Shock strut internal volume in the fully extended position
$S_{max}$: Shock strut maximum stroke
Internal Parameters:
$V_{oil@\hat{T}_{gas}}$: Desired oil volume adjusted to the measured temperature
dT: Integration step
α: Oil thermal expansion coefficient
$n_{gas-added}$: Number of moles of gas in the shock strut
$n_{desired}$: Desired number of moles of gas
Z: Compressibility factor
R: Ideal gas constant
Sensor Measurements:
$\hat{T}_{gas}$: Gas temperature
$\hat{P}_{gas}$: Gas pressure
S: Shock strut stroke Accordingly, with reference to FIG. 1, a landing gear assembly 100 is illustrated. In various embodiments, landing gear assembly 100 comprises a shock strut 104. Shock strut 104 may be mechanically coupled to a wheel assembly 106. In various embodiments, shock strut 104 may be configured to absorb and dampen forces transmitted by wheel assembly 106 to an aircraft.

Shock strut 104 may comprise, for example, a piston 102 and a cylinder 108. Cylinder 108 may be configured to receive piston 102 in a manner that allows the two components to telescope together and absorb and dampen forces transmitted by wheel assembly 106.

In various embodiments, a liquid, such as a hydraulic fluid or oil, is located within cylinder 108. Cylinder 108 and piston 102 may, for example, be configured to seal such that liquid contained within cylinder 108 is prevented from leaking as piston 102 translates relative to cylinder 108. Further, cylinder 108 may be configured to contain a gas such as nitrogen gas or air. Shock strut 104 may comprise a proximal end and a distal end, wherein the distal end is opposite the proximal end, the distal end being the end of the shock strut closest to a wheel or wheel assembly of a vehicle, such as wheel assembly 106, for example. The air may be positioned above the oil (referred to as an "air-over-oil" arrangement) or vice versa, where the term "above" in this context means in the direction of the proximal end of the shock strut. Similarly, cylinder 108 and piston 102 may be sealed such that gas is prevented from leaking as piston 102 moves relative to cylinder 108. As such, shock strut 104 may comprise a pressurized environment within cylinder 108.

Shock strut 104 may further comprise, for example, a gas pressure sensor 110. In various embodiments, gas pressure sensor 110 may be capable of measuring the pressure of the gas within shock strut 104 at a desired time. For example, gas pressure sensor 110 may measure the gas pressure within shock strut 104 before, during, or after take-off, or at any point during the duty cycle of shock strut 104.

In various embodiments, shock strut 104 may further comprise, for example, a gas temperature sensor 112. Gas temperature sensor 112 may be capable of measuring the temperature of the gas within shock strut 104 at any point during the duty cycle of shock strut 104.

Similarly, shock strut 104 may comprise an oil pressure sensor 114. In various embodiments, oil pressure sensor 114 may be capable of measuring the pressure of the oil within shock strut 104 at a desired time. For example, oil pressure sensor 114 may measure the oil pressure within shock strut 104 at any point during the duty cycle of shock strut 104.

In various embodiments, shock strut 104 may include various other sensors. Shock strut 104 may include an oil temperature sensor. An oil temperature sensor may be used to measure the temperature of oil inside of shock strut 104. An oil temperature sensor may aide in determining the pressure of oil inside of shock strut 104.

Shock strut 104 may also comprise a position sensor 116. In various embodiments, position sensor 116 may be capable of measuring the position of piston 102 relative to cylinder 108, which is conventionally referred to as the stroke of shock strut 104 at a desired time. Position sensor 116 may be configured to measure the position indirectly, for example, by measuring the orientation of one or more shock strut torque links 118 (or other components). For example, position sensor 116 may measure the stroke of shock strut 104 at any point during the duty cycle of shock strut 104.

Figure 2:
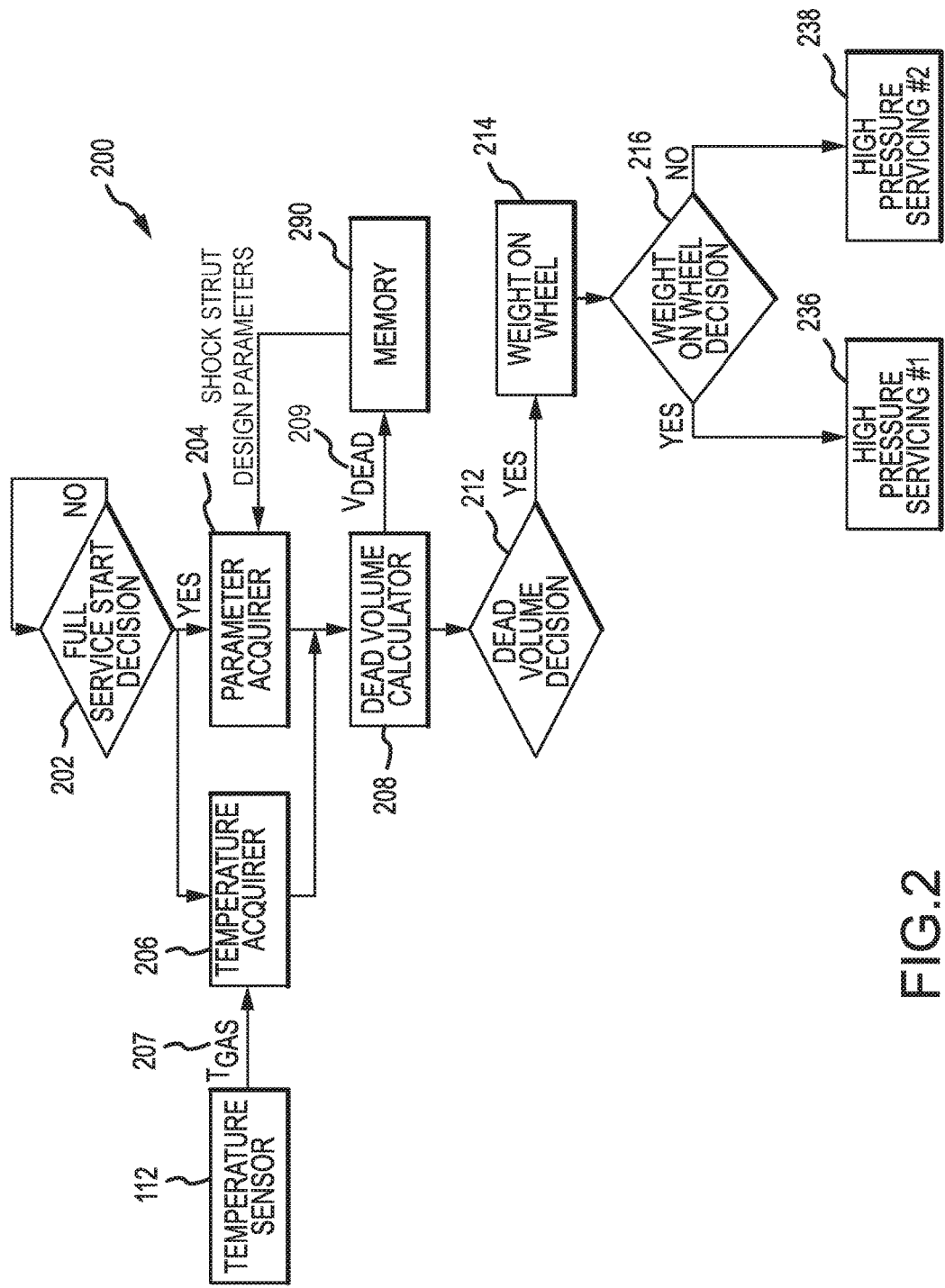
FIG. 2 illustrates a flow chart illustrating a shock strut servicing assistance system, in accordance with various embodiments.

With respect to FIG. 2, elements with like element numbering, as depicted in FIG. 1, are intended to be the same and will not necessarily be repeated for the sake of clarity.

With reference to FIG. 2, a flow chart illustrating a shock strut servicing assistance system (SSSAS) 200 is illustrated, in accordance with various embodiments. In various embodiments, SSSAS 200 may comprise system program instructions and/or controller instructions. SSSAS 200 may be located on a handheld device, a tablet device, a smartphone, a computer, or the like. It is contemplated that SSSAS 200 may be located on any controller located on for example, an aircraft or other vehicle.

SSSAS 200 may include a full service start decision 202, parameter acquirer 204, temperature acquirer 206, dead-volume calculator 208, dead-volume decision 212, and/or weight-on-wheel decision 216. In various embodiments, SSSAS 200 may include memory 290. Memory 290 may be a tangible, non-transitory memory. However, SSSAS 200 may be in electronic communication with memory 290.

In various embodiments, SSSAS 200 may include a shock strut servicing monitoring system (SSSMS). However, in various embodiments, SSSAS 200 and the SSSMS may comprise two separate systems, wherein SSSAS 200 receives various shock strut parameters as one or more inputs.

Figure 3:
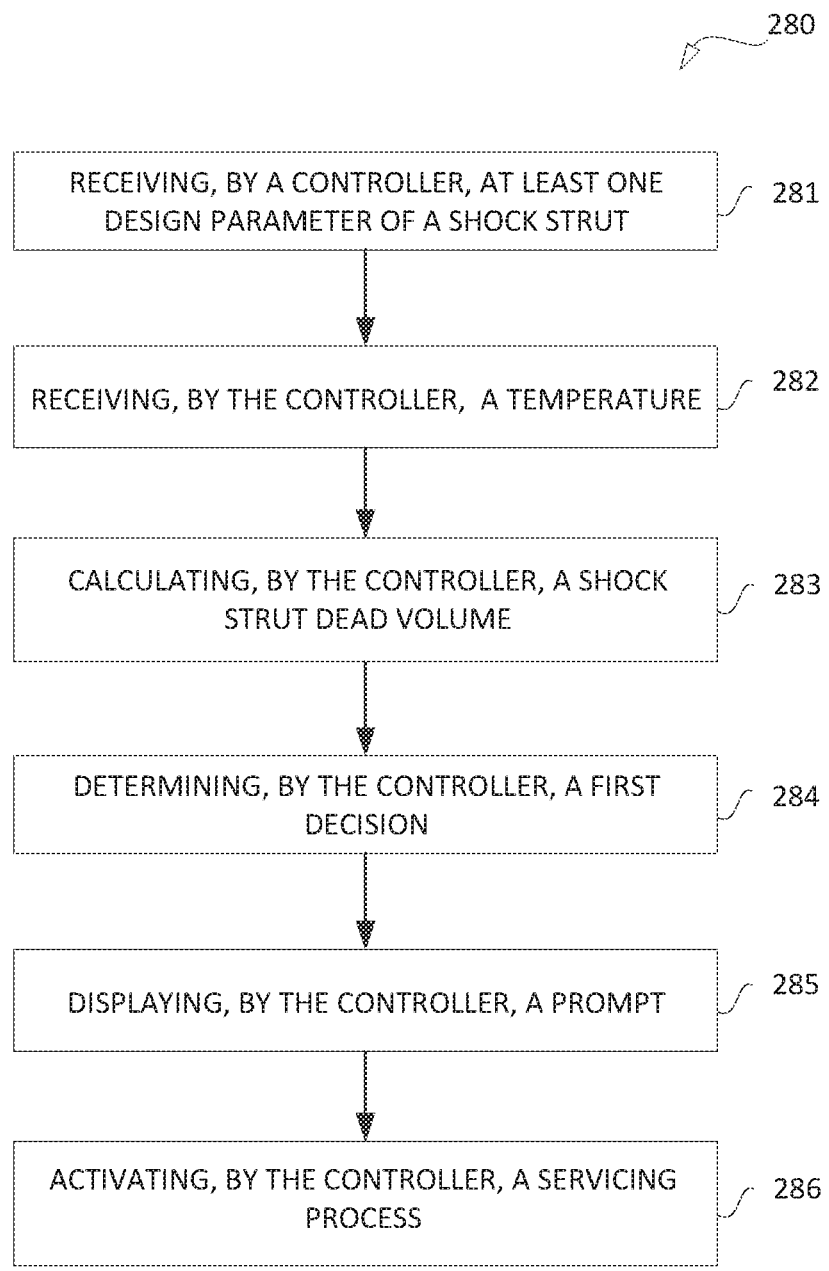
FIG. 3 illustrates the method for assisting shock strut servicing according to FIG. 2, in accordance with various embodiments.

With further reference to FIG. 3, full service start decision 202 may determine if an operator or other source has activated SSSAS 200. Full service start decision 202 may be true when SSSAS 200 has been activated, for example, in response to an operator or an automated system activating SSSAS 200. For example, an operator may indicate to a controller that he would like to start SSSAS 200 by clicking on a selectable tab on a display, pushing a start button, or the like. Parameter acquirer 204 may receive shock strut design parameters in response to full service start decision 202 being true (see step 281). Design parameters may be retrieved from memory 290. Design parameters may include design parameters of a shock strut. Design parameters may include desired gas pressure, desired oil volume, shock strut internal volume in the fully extended position, shock strut max stroke, piston area, and/or over-pressurization used to compensate for initial gas entrainment. In various embodiments, temperature acquirer 206 may receive a gas temperature 207 (see step 282). With momentary reference to FIG. 1, the gas temperature 207 may be the temperature of a gas located inside of shock strut 104. Gas temperature 207 may be measured by gas temperature sensor 112.

In various embodiments, dead-volume calculator 208 may calculate a dead volume 209 of a shock strut (see step 283), which may be stored into memory 290. Dead volume 209 may be calculated according to equation 1 and equation 2 as given below:

$$V_{oil@\hat{T}_{gas}} = V_{oil,nom}\left(1 + \alpha \times dT \times \text{sign}(\hat{T}_{gas} - T_{nom})\right)^{\frac{|\hat{T}_{gas} - T_{nom}|}{dT}} \quad (\text{EQ. 1})$$

$$V_{dead} = V_{tot-in-air} - A \times S_{max} - V_{oil@\hat{T}_{gas}} \quad (\text{EQ. 2})$$

A first decision (also referred to herein as dead-volume decision) 212 may determine if dead volume 209 comprises a negative value (see step 284). For example, dead volume decision 212 may be a Boolean value corresponding to whether or not dead volume 209 is a negative value.

In various embodiments, a first prompt (also referred to herein as weight-on-wheel prompt) 214 may be displayed in response to dead volume 209 comprising a negative value (see step 285). Stated another way, weight-on-wheel prompt 214 may be displayed in response to dead-volume-decision 212 being true. Weight-on-wheel decision 216 may determine if weight-on-wheel prompt 214 is true. For example, an operator may provide a response to weight-on-wheel prompt 214 by typing in values from a keyboard, for example. Thus, weight-on-wheel decision 216 may determine if weight-on-wheel prompt 214 is true in accordance with the response inputted by an operator or received from another source, for example, via avionics.

A first shock strut servicing assistance system (also referred to herein as high pressure servicing #1) 236 may be activated in response to weight-on-wheel decision 216 being true (see step 286). Stated another way, high pressure servicing #1 236 may be activated in response to an operator indicating that the servicing will be performed weight-on-wheel or may be activated from another source, for example, via avionics. The activation of high pressure servicing #1 236 may include displaying instructions on a display indicating that high pressure servicing #1 236 should be used. These instructions may be stored in memory 290.

A second shock strut servicing assistance system (also referred to herein as high pressure servicing #2) 238 may be activated in response to weight-on-wheel decision 216 being false (see step 286). Stated another way, high pressure servicing #2 238 may be activated in response to an operator, or other source, for example, via avionics, indicating that the servicing will not be performed weight-on-wheel or that it will be performed weight-off-wheel. The activation of high pressure servicing #2 238 may include displaying instructions on a display indicating that high pressure servicing #2 238 should be used.

Figure 4A:
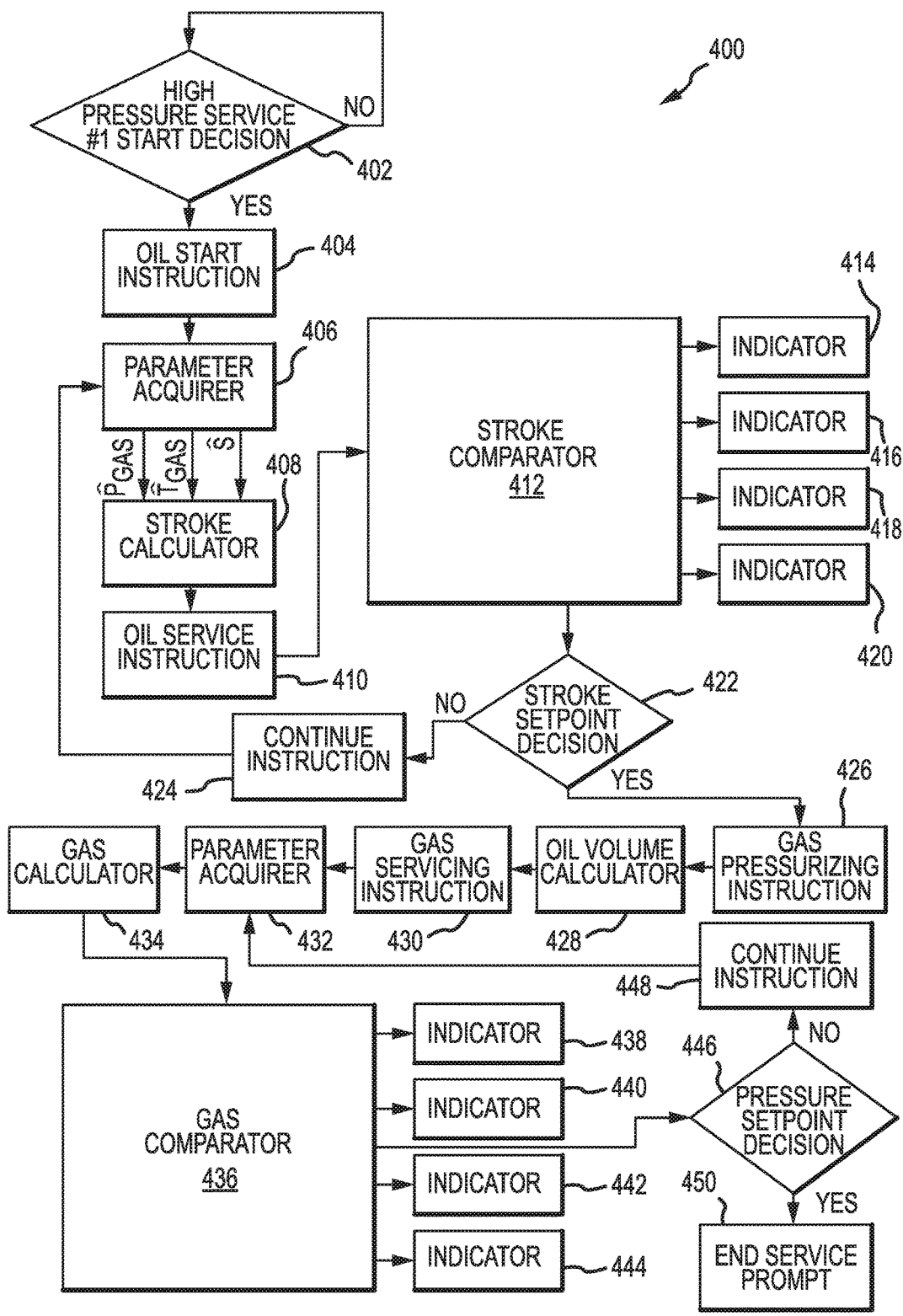
FIG. 4A illustrates a flow chart illustrating a first shock strut high pressure servicing assistance system, in accordance with various embodiments.
Figure 4B:
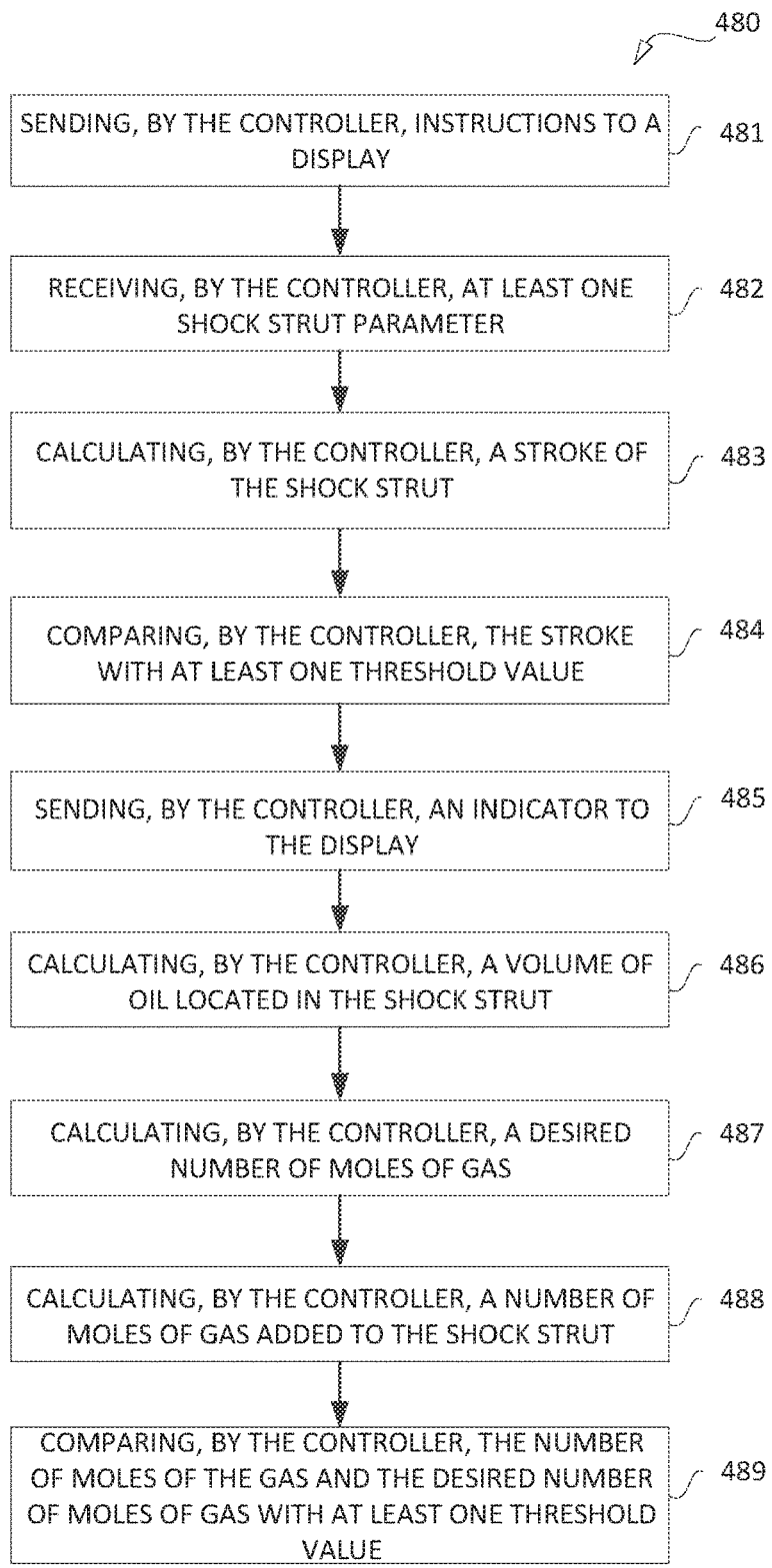
FIG. 4B illustrates the method for assisting shock strut high pressure servicing according to FIG. 4A, in accordance with various embodiments.

With reference to FIG. 4A, a flow chart illustrating a shock strut high pressure servicing assistance system #1 (HP1-SSSAS) 400 is illustrated, in accordance with various embodiments. In various embodiments, HP1-SSSAS 400 may comprise system program instructions and/or controller instructions. HP1-SSSAS 400 may include high pressure service #1 start decision 402, oil start instruction 404, parameter acquirer 406, stroke calculator 408, oil service instruction 410, stroke comparator 412, stroke setpoint decision 422, first continue instruction 424, gas pressurizing instruction 426, oil volume calculator 428, gas servicing instruction 430, parameter acquirer 432, gas calculator 434, gas comparator 436, pressure setpoint decision 446 and/or second continue instruction 448. High pressure service #1 start decision 402 may be true in response to an operator or other source, such as avionics for example, activating HP1-SSSAS 400. For example, an operator may indicate to a controller that he would like to start HP1-SSSAS 400 by clicking on a selectable tab on a display, pushing a start button, or the like. With further reference to FIG. 4B, oil start instruction 404 may be displayed on a display in response to high pressure service #1 start decision 402 being true (see step 481). Oil start instruction 404 may display instructions on a display instructing an operator to add oil into a shock strut from a first valve until oil starts to exit the shock strut from a second valve. Oil start instruction 404 may display instructions on a display instructing an operator to close the second valve.

Parameter acquirer 406 may receive shock strut parameters from a SSSMS or from various shock strut sensors (see step 482). Parameter acquirer 406 may receive shock strut parameters including gas pressure, gas temperature, and/or shock strut stroke. Stroke calculator may use equation 1 and equation 3, as given below, to calculate the stroke setpoint (see step 483).

$$S_{setpoint@\hat{T}_{gas}} = S_{max} - \frac{V_{oil@\hat{T}_{gas}} - (V_{tot-in-air} - A \times S_{max})}{A} \quad \text{(EQ. 3)}$$

The stroke setpoint may be a value which indicates a desired extension of a shock strut piston. Oil service instruction 410 may be displayed on a display and instruct an operator to continue adding oil to the shock strut until third indicator 418 is displayed (see step 481).

Stroke comparator 412 may receive the stroke setpoint as calculated by stroke calculator 408 and the shock strut stroke as acquired by parameter acquirer 406 and compare the difference between these two values, which is equal to a remaining stroke, with one or more stroke threshold values (see step 484). The remaining stroke may refer to the remaining distance required to extend a shock strut piston in order to achieve the stroke setpoint. For example, the remaining stroke may be equal to the shock strut stroke minus the stroke setpoint. In various embodiments, the remaining stroke may be compared with a first stroke threshold value, a second stroke threshold value, and/or a third threshold value. The second stroke threshold value may be greater than the first stroke threshold value. Stroke comparator 412 may comprise one or more if statements.

If the remaining stroke is greater than or equal to the second stroke threshold value, then indicator (also referred to herein as first indicator) 414 may be displayed (see step 485). First indicator 414 may indicate to an operator to continue adding oil to a shock strut.

If the remaining stroke is greater than or equal to the first stroke threshold value and less than the second stroke threshold value, then indicator (also referred to herein as second indicator) 416 may be displayed (see step 485). Second indicator 416 may indicate to an operator to continue adding oil to a shock strut at a slow rate.

If the remaining stroke is less than the first stroke threshold value and greater than or equal to the third stroke threshold value, for example two percent of the first stroke threshold value, negated, then indicator (also referred to herein as third indicator) 418 may be displayed (see step 485). Third indicator 418 may indicate to an operator to stop adding oil to a shock strut.

If the remaining stroke is less than the third threshold value negated, then indicator (also referred to herein as fourth indicator) 420 may be displayed (see step 485). Fourth indicator 420 may indicate to an operator that the shock strut is over serviced with oil and that oil should be slowly released from the shock strut via the second valve.

Stroke setpoint decision 422 may determine if third indicator 418 has been displayed for a pre-determined length of time. First continue instruction 424 may be activated in response to stroke setpoint decision 422 being false. First continue instruction 424 may instruct parameter acquirer 406 to continue acquiring shock strut parameters at a pre-determined rate, such as 10 Hz for example. First continue instruction 424 may display instructions on a display indicating to an operator that further oil adjustment is needed (see step 481).

Gas pressurization instruction 426 may display instructions on a display instructing an operator to disconnect the oil pump, connect a gas cylinder to the second valve and pressurize the gas charging line to, for example, approximately 50 pounds per square inch (psi) (344,737.9 Pa) higher than the shock strut internal pressure (see step 481). Oil volume calculator 428 may acquire shock strut stroke from a shock strut sensor or SSSMS. Oil volume calculator 428 may calculate oil volume using equation 4 provided below (see step 486):

$$V_{oil@\hat{T}_{gas},serviced} = V_{tot-in-air} - A \times \hat{S} \quad \text{(EQ. 4)}$$

Gas servicing instruction 430 may display instructions on a display instructing an operator to slowly open the second valve and add gas to the shock strut until third indicator 442 is displayed. Parameter acquirer 432 may receive shock strut parameters from shock strut sensors or an SSSMS. Parameter acquirer 432 may receive shock strut parameters at a pre-determined rate, such as 10 Hz, for example.

Gas calculator 434 may use equation 5, provided below, to calculate a desired number of moles of gas (see step 487). Gas calculator 434 may use equation 6, provided below, to calculate the number of moles of gas added to a shock strut during HP1-SSSAS 400 (see step 488).

$$n_{desired} = \frac{(P_{gas,nom} + \Delta P_{entrainment}) \times (V_{tot-in-air} - V_{oil,nom})}{R \times T_{gas,nom} \times Z(P_{gas,nom}, T_{gas,nom})} \quad \text{(EQ. 5)}$$

$$n_{gas-added} = \frac{\hat{P}_{gas} \times \left(V_{tot-in-air} - V_{oil@\hat{T}_{gas},serviced} - A \times \hat{S}\right)}{R \times \hat{T}_{gas} \times Z(\hat{P}_{gas}, \hat{T}_{gas})} \quad \text{(EQ. 6)}$$

Gas comparator 436 may receive the desired number of moles of gas and the number of moles of gas added to the shock strut as calculated by gas calculator 434. Gas comparator 436 may compare the difference between these two values, which equals a number of moles of gas loss, with one or more number of moles threshold values (see step 489). For example, the number of moles of gas loss may be equal to the desired number of moles of gas minus the number of moles of gas added. In various embodiments, the number of moles of gas loss may be compared with a first number of moles threshold value, a second number of moles threshold value, and/or a third number of moles threshold value. The second number of moles threshold value may be greater than the first number of moles threshold value. Gas comparator 436 may comprise one or more if statements.

If the number of moles of gas loss is greater than or equal to the second number of moles threshold value, then indicator (also referred to herein as first indicator) 438 may be displayed (see step 485). First indicator 438 may indicate to an operator to continue adding gas to a shock strut.

If the number of moles of gas loss is greater than or equal to the first number of moles threshold value and less than the second number of moles threshold value, then indicator (also referred to herein as second indicator) 440 may be displayed (see step 485). Second indicator 440 may indicate to an operator to continue adding gas to a shock strut at a slowed rate so as to prevent the operator from over-filling the shock strut with gas.

If the number of moles of gas loss is less than the first number of moles threshold value and greater than or equal to the third number of moles threshold values, for example, two percent of the desired number of moles of gas, negated, then indicator (also referred to herein as third indicator) 442 may be displayed (see step 485). Third indicator 442 may indicate to an operator to stop adding gas to a shock strut.

If the number of moles of gas loss is less than the third number of moles threshold value negated, then indicator (also referred to herein as fourth indicator) 444 may be displayed (see step 485). Fourth indicator 444 may indicate to an operator that the shock strut is over serviced with gas and that gas should be released from the shock strut to decrease the pressure of the gas located inside of the shock strut.

Pressure setpoint decision 446 may determine if third indicator 442 has been displayed for a pre-determined length of time. Second continue instruction 448 may be activated in response to pressure setpoint decision 446 being false. Second continue instruction 448 may instruct parameter acquirer 432 to continue acquiring shock strut parameters. Second continue instruction 448 may display instructions on a display indicating to an operator that further gas adjustment is needed. End service prompt 450 may be displayed on a display in response to pressure setpoint decision 446 being true. End service prompt 450 may indicate that the amount of gas added to the shock strut is acceptable and indicate the end of HP1-SSSAS 400.

Figure 5A:
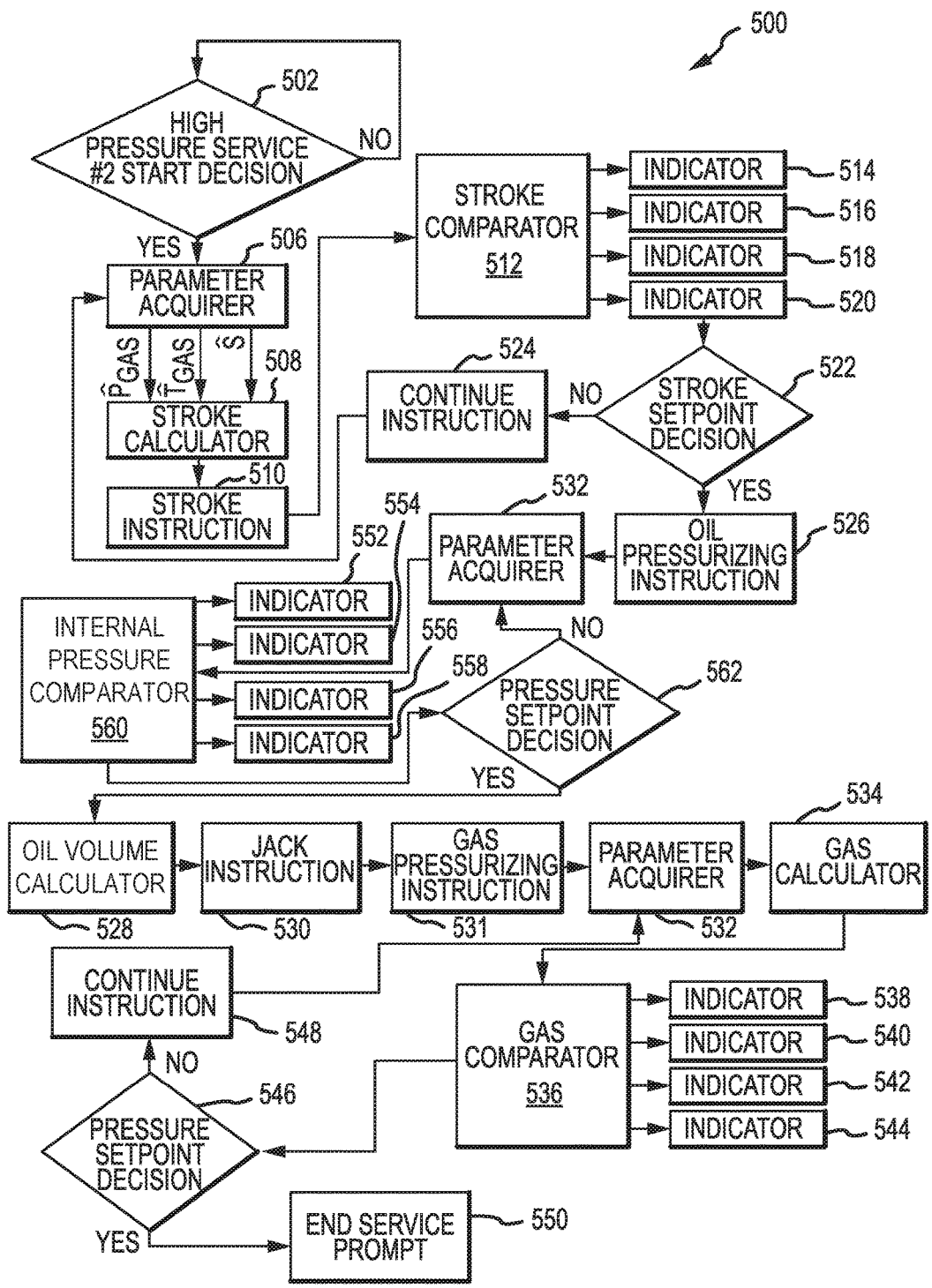
FIG. 5A illustrates a flow chart illustrating a second shock strut high pressure servicing assistance system, in accordance with various embodiments.

With reference to FIG. 5A, a flow chart illustrating a shock strut high pressure servicing assistance system #2 (HP2-SSSAS) 500 is illustrated, in accordance with various embodiments. In various embodiments, HP2-SSSAS 500 may comprise system program instructions and/or controller instructions. HP2-SSSAS 500 may include high pressure service #2 start decision 502, parameter acquirer 506, stroke calculator 508, stroke instruction 510, stroke comparator 512, stroke setpoint decision 522, first continue instruction 524, oil pressurization instruction 526, parameter acquirer 532, internal pressure comparator 560, first pressure setpoint decision 562, oil volume calculator 528, jack instruction 530, gas pressurizing instruction 531, parameter acquirer 532, gas calculator 534, gas comparator 536, second pressure setpoint decision 546 and/or second continue instruction 548. High pressure service #2 start decision 502 may be true when an operator has activated HP2-SSSAS 500. For example, an operator or other source, such as avionics for example, may indicate to a controller that he would like to start HP2-SSSAS 500 by clicking on a selectable tab on a display, pushing a start button, or the like.

Figure 5B:
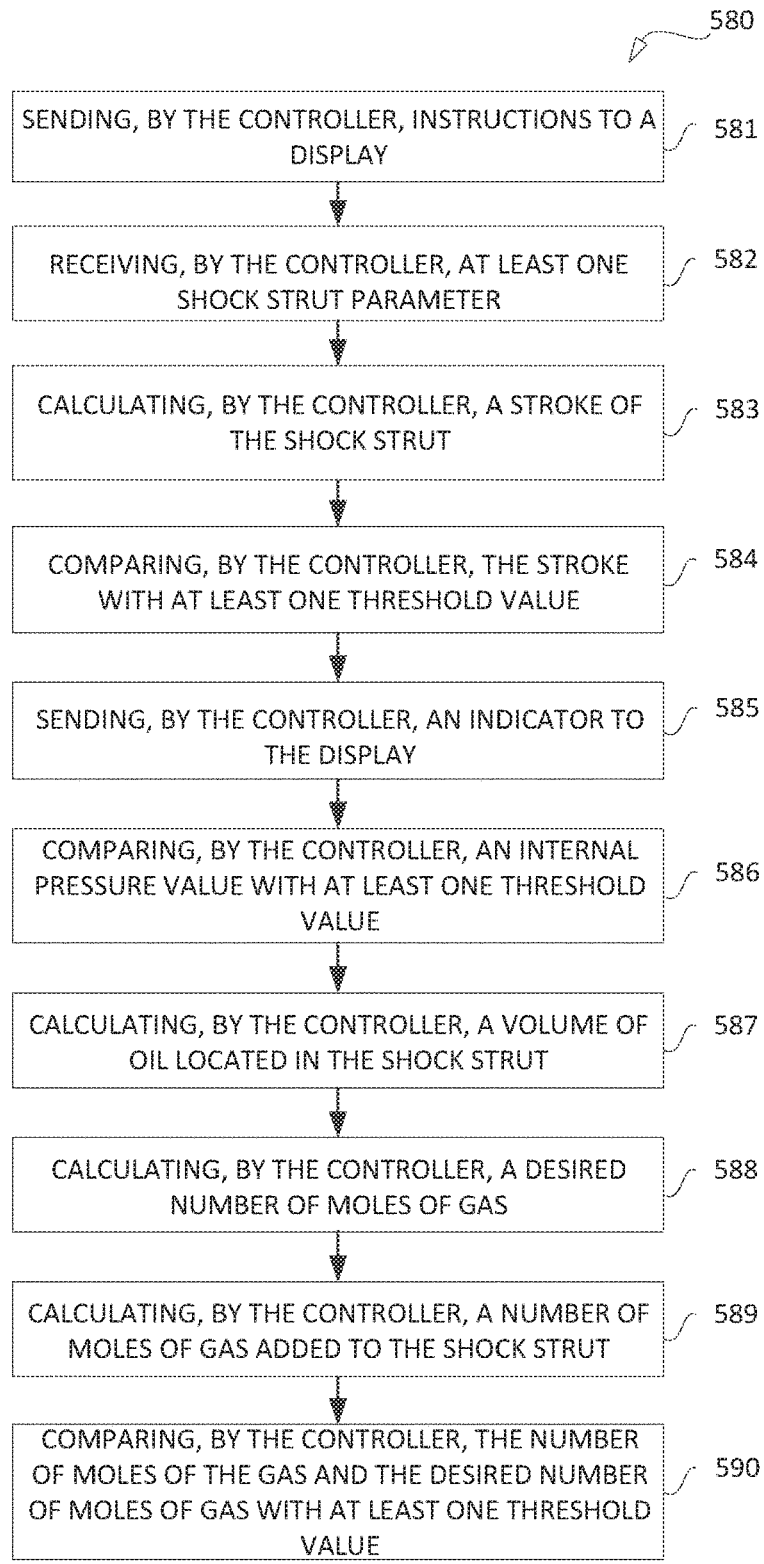
FIG. 5B illustrates the method for assisting shock strut high pressure servicing according to FIG. 5A, in accordance with various embodiments.

With further reference to FIG. 5B, parameter acquirer 506 may receive shock strut parameters from a SSSMS or from various shock strut sensors (see step 582). Parameter acquirer 506 may receive shock strut parameters including gas pressure, gas temperature, and/or shock strut stroke. Stroke calculator may use equation 1 and equation 3, as given herein, to calculate the stroke setpoint (see step 583). The stroke setpoint may be a value which indicates a desired extension of a shock strut piston.

Stroke instruction 510 may be displayed on a display and instruct an operator to compress a shock strut using a landing gear jack so that the stroke setpoint is achieved (see step 581).

Stroke comparator 512 may receive the stroke setpoint as calculated by stroke calculator 508 and the shock strut stroke as acquired by parameter acquirer 506 and compare the difference between these two values, which is equal to a remaining stroke, with one or more stroke threshold values (see step 584). The remaining stroke may refer to the remaining distance required to compress a shock strut piston in order to achieve the stroke setpoint. In various embodiments, the remaining stroke may be equal to the stroke setpoint minus shock strut stroke. In various embodiments, stroke comparator 512, first indicator 514, second indicator 516, third indicator 518, and fourth indicator 520 may be similar to stroke comparator 412, first indicator 414, second indicator 416, third indicator 418, and fourth indicator 420, respectively (see FIG. 4A) (see step 585).

Stroke setpoint decision 522 and first continue instruction 524 may be similar to stroke setpoint decision 422 and first continue instruction 424, respectively (see FIG. 4A).

Oil pressurization instruction 526 may display instructions on a display instructing an operator to secure the landing gear, open a second valve, connect an oil pump to a first valve and pump oil into the shock strut via the first valve until oil begins to exit the second valve. Oil pressurization instruction 526 may display instructions on a display instructing an operator to close the second valve and continue pumping oil into the shock strut via the first valve until oil located inside of the shock strut comprises a pre-determined pressure, of 150 psi (1,034,213.6 Pa) for example. (see step 581).

Parameter acquirer 532 may receive a value indicating the internal of a shock strut from a shock strut sensor or an SSSMS at a pre-determined rate, such as 10 Hz for example (see step 582). Internal pressure comparator 560 may compare this pressure with at least one threshold value (see step 586). Internal pressure comparator 560 may compare the pressure with a first pressure threshold value, a second pressure threshold value, and a third pressure threshold value. The first pressure threshold value may comprise a value of 50 psi (344,737.9 Pa). The second pressure threshold value may comprise a value of 100 psi (689,475.7 Pa). The third pressure threshold value may comprise a value of 150 psi (1,034,213.6 Pa). Internal pressure comparator 560 may comprise one or more if statements.

If the internal pressure is less than or equal to the first pressure threshold value, then indicator (also referred to herein as first indicator) 552 may be displayed (see step 585). First indicator 552 may indicate to an operator to continue adding oil to a shock strut.

If the internal pressure is greater than the first pressure threshold value and less than or equal to the second pressure threshold value, then indicator (also referred to herein as second indicator) 554 may be displayed (see step 585). Second indicator 554 may indicate to an operator to continue adding oil to a shock strut at a slow rate.

If the internal pressure is less than or equal to the third pressure threshold value and greater than the second pressure threshold value, then indicator (also referred to herein as third indicator) 556 may be displayed (see step 585). Third indicator 556 may indicate to an operator to stop adding oil to a shock strut.

If the internal pressure is greater than the third pressure threshold value, then indicator (also referred to herein as fourth indicator) 558 may be displayed (see step 585). Fourth indicator 558 may indicate to an operator that the shock strut is over serviced with oil and that oil should be slowly released from the shock strut via the second valve.

First pressure setpoint decision 562 may determine if third indicator 556 has been displayed for a pre-determined length of time. Parameter acquirer 532 may continue to acquire gas pressure in response to first pressure setpoint decision 562 being false.

Oil volume calculator 528 may acquire shock strut stroke from a shock strut sensor or SSSMS. Oil volume calculator 528 may calculate oil volume using equation 4 as provided herein similar to oil volume calculator 428 (see FIG. 4A) (see step 587).

Jack instruction 530 may display instructions on a display instructing an operator to disconnect the oil pump and slowly remove the landing gear jack so that the pressure inside of the shock strut drops to zero gauge pressure and to connect the gas bottle to the second valve. Gas pressurizing instruction 531 may display instructions on a display instructing an operator to pressurize a gas charging hose to, for example, 50 psi (344,737.9 Pa) and to slowly open the second valve so that a shock strut piston extends to a fully extended position. Gas pressurizing instruction 531 may display instructions on a display instructing an operator to continue adding gas to the shock strut after the shock strut piston is fully extended. Parameter acquirer 532 may receive shock strut parameters from shock strut sensors or an SSSMS. Parameter acquirer 532 may receive shock strut parameters at a pre-determined rate, such as 10 Hz, for example.

Gas calculator 534 may use equation 5, provided herein, to calculate a desired number of moles of gas (see step 588). Gas calculator 534 may use equation 6, provided herein, to calculate the number of moles of gas added to a shock strut during HP2-SSSAS 500 (see step 589). Gas calculator 534 may be similar to gas calculator 434 (see FIG. 4A).

Gas comparator 536 may be similar to gas comparator 436 (see FIG. 4A) (see step 590). First indicator 538, second indicator 540, third indicator 542, and fourth indicator 544 may be similar to first indicator 438, second indicator 440, third indicator 442, and fourth indicator 444, respectively (see FIG. 4A).

Second pressure setpoint decision 546, second continue instruction 548, and end service prompt 550 may be similar to pressure setpoint decision 446, second continue instruction 448, and end service prompt 450 (see FIG. 4A).

Various controller operations are described herein with respect to instructions received by the controller, causing the controller to performing operations in response to instructions inputted by an operator or other source, such as avionics for example. However, it is contemplated that these instructions and/or inputs may be received by other sources such as via avionics, values stored in system memory, shock strut sensors, aircraft systems, or the like.

Various systems are described herein as being configured to be able to send instructions to a display. These instructions may be visible to a person such as an operator performing a shock strut service and thus may be referred to herein as visible instructions.

Figure 6:
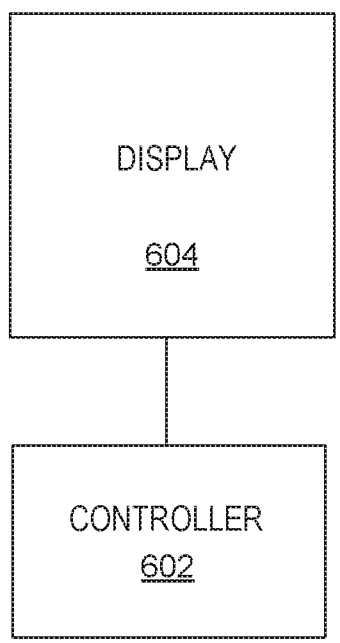
FIG. 6 illustrates a controller in electronic communication with a display, in accordance with various embodiments.

With reference to FIG. 6, a controller 602 is illustrated in electronic communication (e.g., in wired or wirelessly coupled) with a display 604, in accordance with various embodiments. Controller 602 may comprise SSSAS 200 (see FIG. 2), HP1-SSSAS 400 (see FIG. 4), and/or HP2-SSSAS 500 (see FIG. 5). Controller 602 and/or display 604 may be located on any suitable device such as a desktop computer, a handheld device, a cellphone, or a controller located onboard an aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shock strut servicing assistance system, comprising:
a controller in electronic communication with a display; and
a tangible, non-transitory memory configured to communicate with the controller, the tangible, non-transitory memory having instructions stored thereon that, in response to execution by the controller, cause the controller to perform operations comprising:
receiving, by the controller, at least one shock strut parameter of a shock strut configured for mechanical coupling to a wheel assembly, the at least one shock strut parameter including at least a temperature of a gas and at least one shock strut design parameter;
calculating, by the controller, a dead volume of a shock strut based upon the at least one shock strut parameter; and
determining, by the controller, a first decision, the first decision being a Boolean value based upon whether the dead volume of the shock strut is negative;
sending, by the controller, a weight-on-wheel prompt to the display, wherein the weight-on-wheel prompt is sent in response to the first decision being true, the weight-on-wheel prompt calls for an operator to indicate whether a shock strut servicing will be performed under weight-on-wheel conditions;
receiving, by the controller, a weight-on-wheel decision based upon the weight-on-wheel prompt;

activating, by the controller, a first shock strut servicing assistance system in response to the weight-on-wheel decision being true; and activating, by the controller, a second shock strut servicing assistance system in response to the weight-on-wheel decision being false.

2. The shock strut servicing assistance system of claim 1, wherein the at least one shock strut design parameter is received from a memory.

3. The shock strut servicing assistance system of claim 1, wherein the temperature of the gas is received from a temperature sensor.

* * * * *